United States Patent [19]

Gessaga

[11] 4,276,105
[45] Jun. 30, 1981

[54] PROCESS AND APPARATUS FOR STITCHING THE TREAD OF PNEUMATIC TIRES

[75] Inventor: Rinaldo Gessaga, Milan, Italy

[73] Assignee: Industrie Pirelli S.p.A., Milan, Italy

[21] Appl. No.: 86,305

[22] Filed: Oct. 19, 1979

[30] Foreign Application Priority Data

Oct. 31, 1978 [IT] Italy .............................. 29262 A/78

[51] Int. Cl.³ .......................................... B29H 17/08
[52] U.S. Cl. ......................... 156/128 N; 152/361 R; 156/133; 156/412; 156/413; 156/421
[58] Field of Search ............... 152/361 R; 156/123 R, 156/128 R, 128 N, 129, 133, 408–413, 421, 468, 470, 471, 475, 477, 481, 486–489

[56] References Cited

U.S. PATENT DOCUMENTS

| | | | |
|---|---|---|---|
| 1,834,559 | 12/1931 | Waner | 156/412 |
| 2,056,450 | 10/1936 | Haberstump | 156/487 |
| 2,464,020 | 3/1949 | Breth | 156/413 |
| 2,600,291 | 6/1952 | Engler | 156/412 |
| 3,784,438 | 1/1974 | Dullinger | 156/487 |
| 3,819,449 | 6/1974 | Caretta | 156/413 |
| 4,052,246 | 10/1977 | Albareda et al. | 156/412 |
| 4,095,731 | 6/1978 | Harding et al. | 156/487 |

Primary Examiner—John E. Kittle
Attorney, Agent, or Firm—Stevens, Davis, Miller & Mosher

[57] ABSTRACT

The tread of a pneumatic tire is bonded to a toroidal shaped radial tire carcass and a reinforcing structure which has discontinuities in its thickness in two planes parallel to the equatorial plane of the tire by a stitching process wherein the annular central portion of the tread while unvulcanized is first rotated against a brush. The lateral portions of the tread which overlie the thickest edge portions of the reinforcing structure are also pressed by rotating brushes commencing while the central portion is being pressed and the annular areas of the tread intermediate the center and lateral areas are pressed with metallic discs. The lateral portions of the tread overlying the thickest parts of the reinforcing structure are then pressed with metallic discs. The process and apparatus having two sets of brushes to achieve the sequence of pressing steps adhere the unvulcanized tread to the underlying structure without air bubbles being trapped therebetween.

17 Claims, 12 Drawing Figures

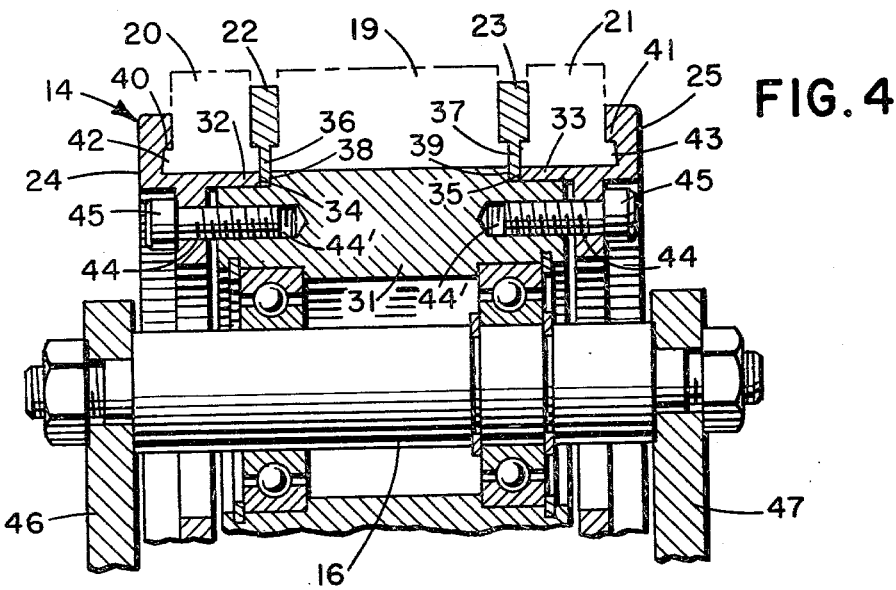
FIG. 4
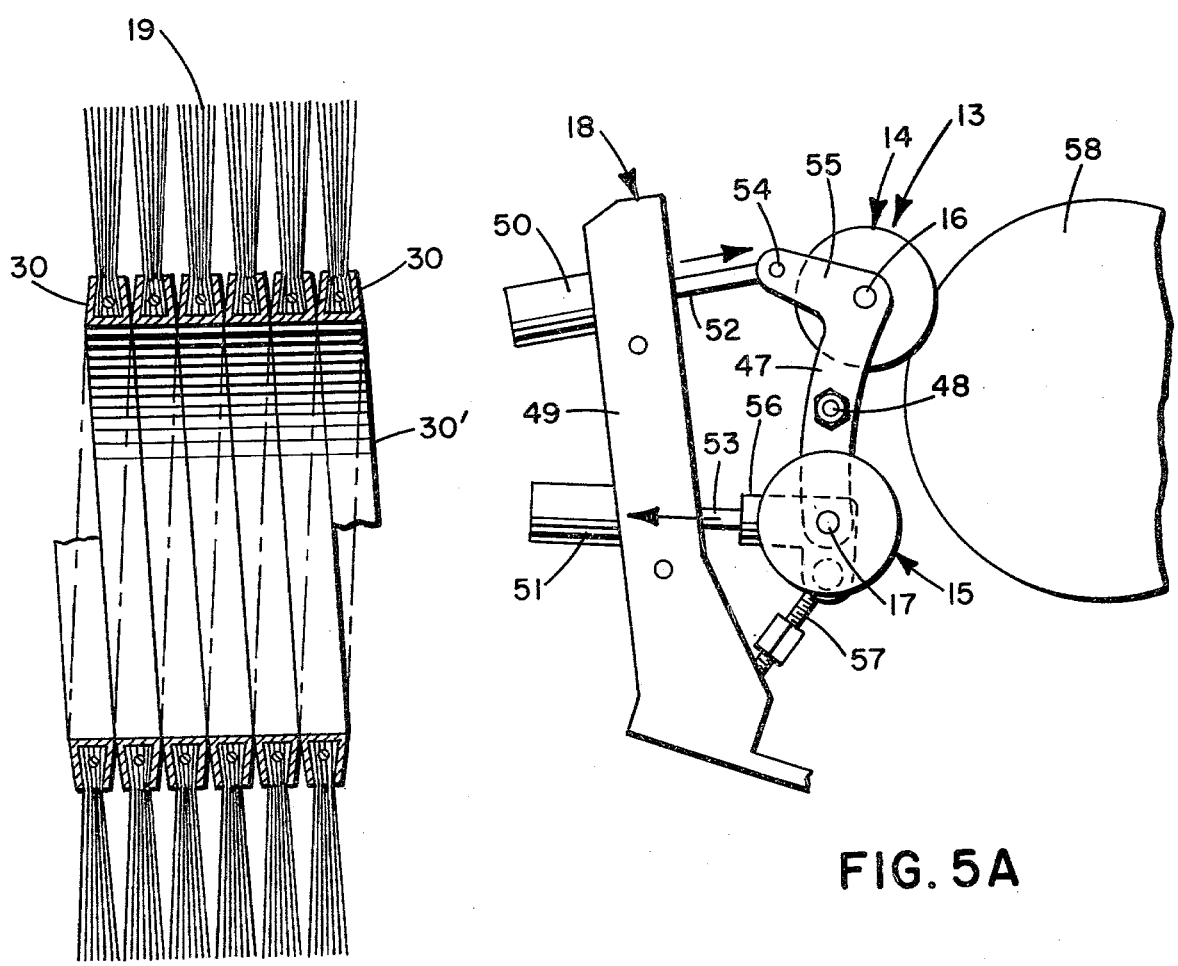
FIG. 3
FIG. 5A

PROCESS AND APPARATUS FOR STITCHING THE TREAD OF PNEUMATIC TIRES

This invention relates to a process and to an apparatus for stitching the tread of pneumatic tires, in particular radial tires comprising a radial carcass, a reinforcing structure (breaker) formed by a plurality of reinforcing layers or plies having different width and a tread. This invention is an improvement over the apparatus and process described in U.S. Pat. No. 3,819,449 granted June 25, 1974, the disclosure of which is incorporated herein by reference.

As known, the manufacture of radial tires involves the main steps of shaping the carcass into a toroidal configuration, of applying the reinforcing structure and the tread to the toroidal shaped carcass and adhering the tread to the underlying reinforcing structure in place while removing the air bubbles entrapped between the tread and the reinforcing structure.

Conventionally, the tread is adhered or "stitched" by means of metallic discs either by "dynamic" stitching or "static" stitching. The "dynamic stitching" of the tread on a tire while it is associated with a tire building drum is accomplished by means of two metallic discs or rollers which are advanced first into contact with the tread on a place which is perpendicular to the rotation axis of the building drum coinciding with the middle plane of the drum and then, always under pressure, displacing the rollers laterally on the tread symmetrically towards the edges of the tread band while the drum is rotated.

This method is not entirely satisfactory because of the shape of the discs or rollers which have a practically pointed work profile of steel, and because the impact force of the discs on the tread can cause deformation of the underlying reinforcing layers.

Moreover, the displacement of the discs sometimes permits an inadmissible slipping of the tread with respect to the underlying structure.

A further drawback of the "dynamic stitching" method consists in that the trajectories run by the two discs are substantially helicoidal so that portions of the tread between convolutions are not stitched and air becomes entrapped between the tread and the reinforcing structure.

There is further disadvantage to dynamic stitching which is due to the plasticity state of the rubber before vulcanization. The unvulcanized rubber in the lateral zones of the tread band where the stitching ends thickens. This thickening is accompanied by an unavoidable increase in the tread width.

Moreover, it is difficult to synchronize the movement of the discs towards the drum axis and furthermore, even if the discs are synchronized, there is the drawback that the displacement of the discs involves too much time.

The "static" stitching is achieved by means of a series of thin metallic discs which substantially follow the tread profile. The discs are rotatably mounted on an axis which is parallel to the building drum.

In this method, a portion of the tread arranged astride the middle plane is stitched first with a centrally disposed disc and then the remainder of the tread width is pressed by means of a series of pairs of discs progressively and symmetrically with the middle plane of the tread band.

The "static" stitching method solves the problem with the dynamic stitching method of the possible out of alignment of the tread with respect to the reinforcing structure, but deformation by impact of the discs on the tread occurs with damages of the tread and of the underlying reinforcing structure.

Progressive stitching as in the "static" method can be difficult since it is practically impossible to copy exactly the profile of some carcass with the stitching discs. This is especially true in pneumatic tires having a radial carcass which are provided with cord reinforced rubber strips along the lateral edges of the breaker immediately below the tread and metallic belt but which do not cover the edges of the belt or in tires having cord reinforced rubber strips which extend from the edges of the metallic belt through the sidewall to the beads.

In this case, the discs during the stitching step on the central portion of the tread tend to deflect the underlying parts of the reinforcing layers causing the presence of annular lateral grooves with entrapped air in the space between the upper reinforcing layer, belt and wall represented by the thickness of the rubber strips or of the lateral layers.

The subsequent progressive stitching with a second pair of discs on the tread portions overlying the rubber strips further seals the grooves which makes it even more difficult for air to escape with the result that poor adhesion of the tread is obtained.

It is therefore apparent that static or progressive stitching of the tread by means of metallic discs is not suitable for radial tires having a reinforcing structure which may vary in thickness from point to point.

It is therefore an object of the present invention to provide a process for manufacturing pneumatic tires which have a carcass, a tread and a reinforcing structure placed between the carcass and the tread, the reinforcing structure having at the ends of its reinforcing layers at least two variations in thickness with respect to the equatorial plane of the tire, each variation in thickness being detectable in two planes parallel to the equatorial plane, up line and down line of the thickness variation, the thickness being greater in the axially outermost plane.

Other objects will become apparent from the following description with reference to the accompanying drawing wherein FIG. 1 illustrates in perspective view a tire to which the invention can be applied;

FIG. 3 illustrates the composition of the brushes of the device illustrated in FIG. 2;

FIG. 4 illustrates the support for the rollers of the device illustrated in FIG. 2;

Figure 1:
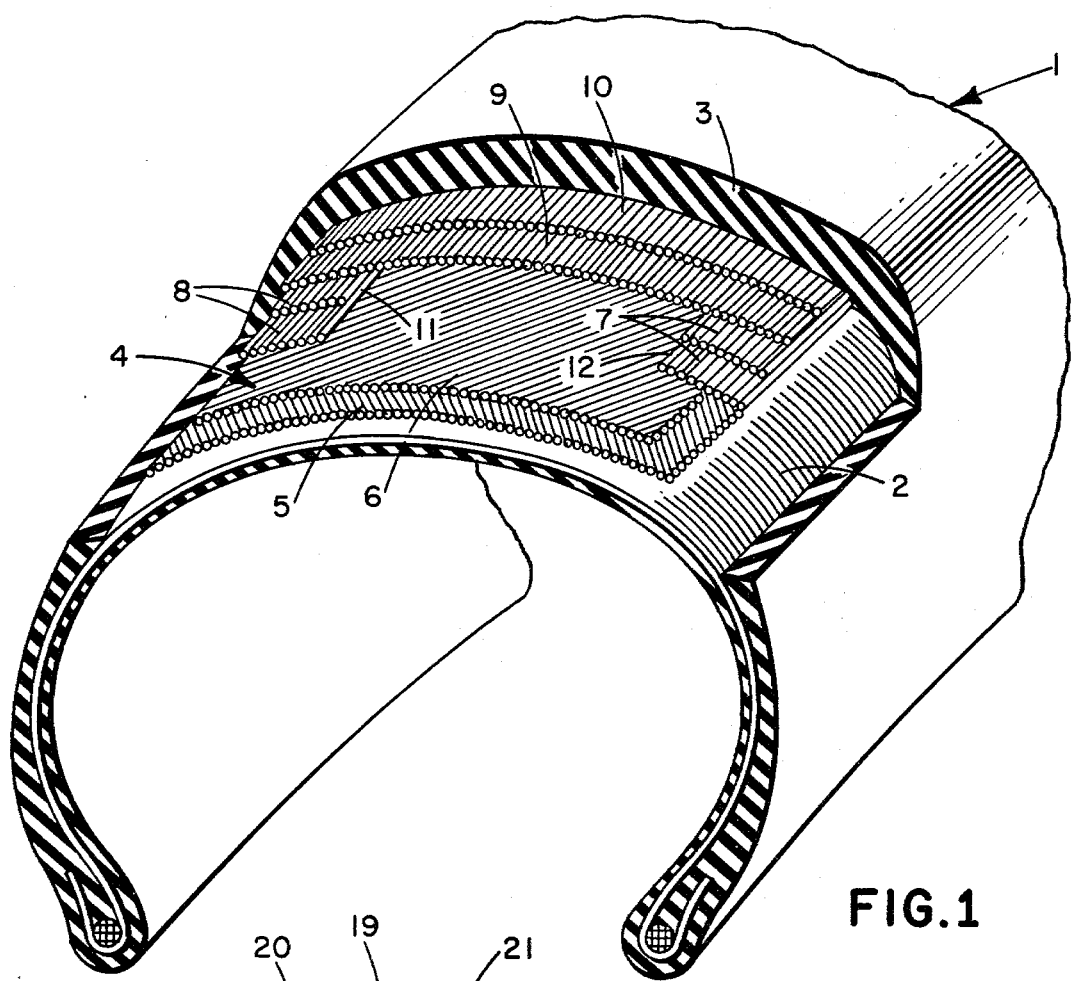
Figure 2:
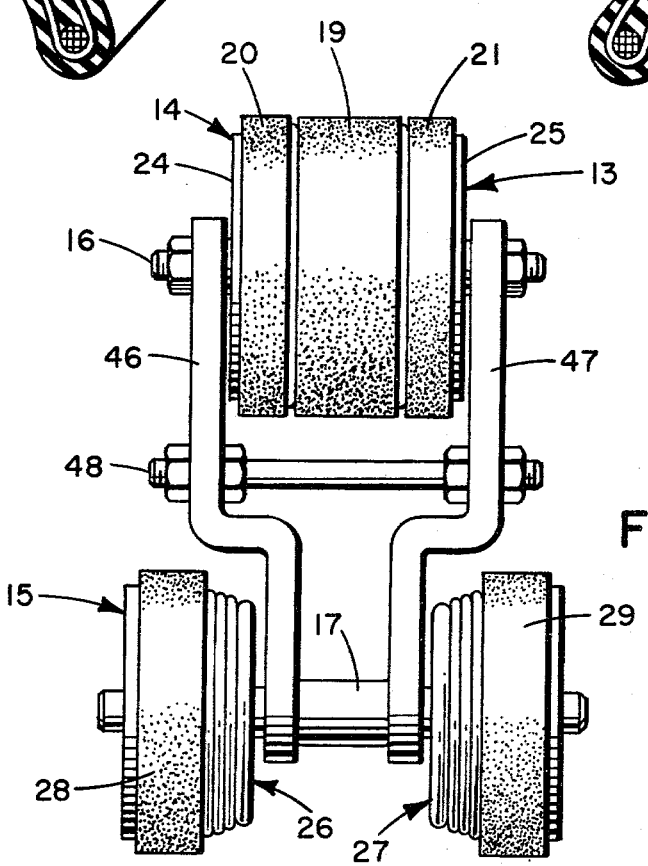
FIG. 2 illustrates an embodiment of a stitching device.
Figure 5B:
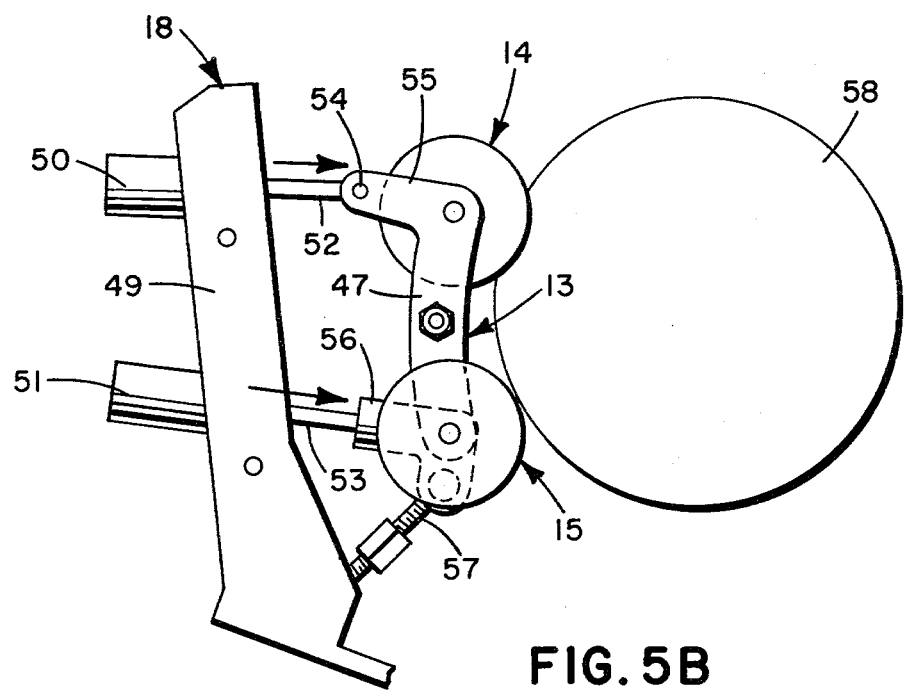
Figure 10:
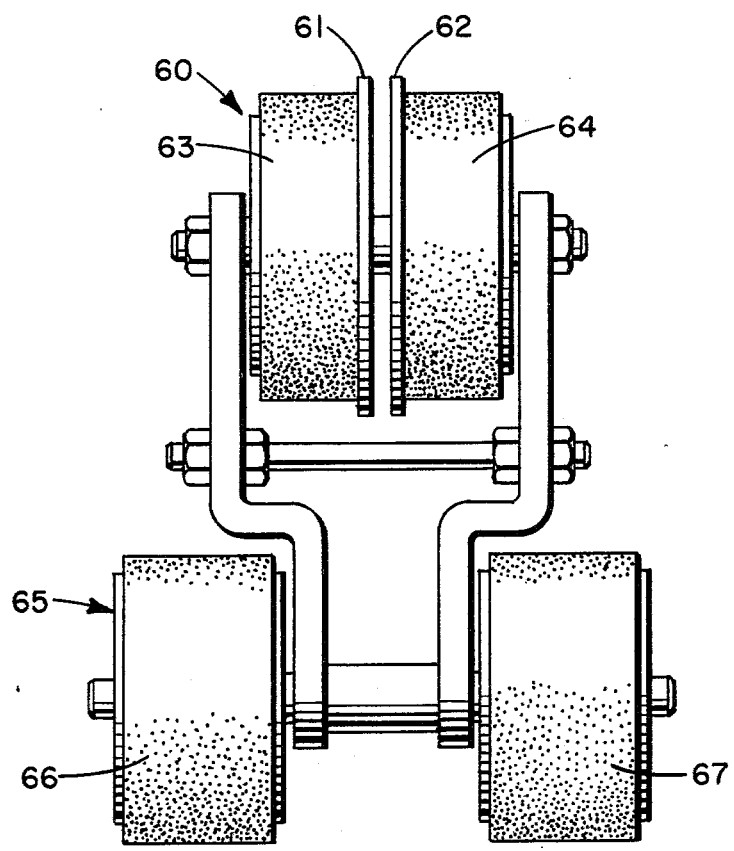

FIGS. 5A, B, and C illustrate diagrammatically the device of FIG. 2 associated with a stitching bench during three steps (a), (b) and (c) of the stitching process;

FIGS. 6, 7, 8 and 9 illustrate the device of FIG. 2 in the various sequences of the tread stitching process relating to the tire shown in FIG. 1 stripped of the radially outermost reinforcing layer; and FIG. 10 illustrates an alternative embodiment of the stitching device provided by the invention especially useful for stitching a tread having circumferential grooves.

The foregoing objects and others are accomplished in accordance with the invention, generally speaking, by providing a process wherein after the toroidal configuration has been imparted to the carcass and to the reinforcing structure and the tread band has been applied over the carcass and reinforcing structure, the tread is bonded to the reinforced carcass by (a) stitching first the central portion of the tread by pressing it only with the filaments of a brush, (b) subsequently stitching, starting at the beginning of step (a) and continuing during step (a), at least a width of the lateral portions of the tread overlying the reinforcing layers which have greater thickness with the filaments of a brush and stitching the tread portion between the central zone and the lateral zones with metallic discs;

(c) stitching after step (b) by means of metallic discs the lateral portions of the tread overlying the thickest part of the reinforcing layers, and (d) stitching after step (c) the tread end by pressing with metallic discs.

This process is advantageously used for low section tires which are particularly difficult to stitch by progressive stitching with metallic discs. In particular, the process is advantageous for stitching the tread of radial tires which have both a radial carcass and a reinforcing structure disposed between the carcass and the tread, with the reinforcing structure comprising at least two layers of crossed metallic cords and symmetrically oriented with respect to the longitudinal direction of the tire constituting the belt, at least two reinforcing strips, the first strip being superimposed on the first end of the metallic belt and the second strip being superimposed on the second end of the belt.

Therefore, the present invention is applied to tires whose reinforcing structure has layers whose total thickness with respect to a plane parallel to the equatorial plane of the tire is less than the total thickness of the adjacent layers superimposed on the edge of the belt with respect to a second plane which is parallel and outermost to the first plane.

The essential characteristic of the process includes the combined stitching action on the tread by means of brushes made of synthetic or natural or metallic filaments (for instance steel wires) and by means of metallic discs according to pre-established positions and sequences.

The improved results achieved depend on the fact that the brushes which apply less pressure than metallic discs press the central portion of the tread above the reinforcing structure which does not have variations in thickness and requires lower stitching pressure and also press on the lateral portions of the tread above the rubber strips where, at least at the beginning, lower stitching pressures are required thereby providing a way for the escape for the air forced outwards by the stitching action of the metallic discs inserted between the central and lateral brushes.

Moreover, the advantages of the process depend on the noncoordinated action of the single filaments, so that the profile of the extruded green tread is not modified, but there is stitching of the tread on the carcass.

Subsequently, after the formation of air pockets between the tread and the reinforcing structure has been avoided, the stitching of the tread portions above the rubber strips before the reinforcing structure and tread is performed by means of metallic discs.

A further object of the invention is to provide a device for stitching the tread of radial tires which have a carcass, a tread and a reinforcing structure placed between the tread and the carcass, the device comprising, at least a first stitching group constituted by a combination of rollers formed by brushes provided with filaments and metallic discs coaxially mounted on the same rotation shaft, means for varying the number and the composition of the rollers on the shaft, said brushes being provided with filaments which are suitable for stitching either the tread portions overlying lengths of the reinforcing structure up line and down line of variations in thickness in pneumatic tires which comprise in an axially outermost position a reinforcing layer having a greater total thickness or having a tread provided with circumferential grooves.

In the preferred embodiment of the invention, the device is characterized by the fact of comprising a first group of rollers for stitching the tread of radial tires which comprises a radial carcass, a tread, a reinforcing structure placed between the carcass and the tread, said reinforcing structure comprising at least one belt formed by two layers of crossed metallic cords and symmetrically oriented with respect to the longitudinal direction of the tire and at least two rubber strips along the edge of the belt, provided with nylon cords arranged parallel to the equatorial plane, said first stitching group comprising a central brush made of filaments to stitch the central portion of the tread, two lateral brushes for stitching the tread portions overlying the rubber strips, two metallic discs placed between the central and lateral brushes to stitch the tread portions disposed between the central zone and the lateral zones up line of the rubber strips.

In a preferred embodiment of the device, a second stitching group of rollers is provided with a first and a second plurality of metallic discs mounted at the end of a second rotation shaft, each plurality comprising discs having a diameter gradually increasing from the innermost towards the outermost so as to obtain a profile corresponding to the lateral portion of the tread overlying the rubber strips to be stitched after stitching by the application of the first group.

The present invention is particularly adaptable for the manufacture of radial tires having reinforcing structures differentiated from each other both owing to the number of the various layers and owing to the dimensions of the layers.

By way of example, FIG. 1 illustrates one of these tires.

The pneumatic tire 1 has a radial carcass 2, a tread 3, and a reinforcing structure 4 placed between the tread and the carcass.

The reinforcing structure 4 is constituted, from the inside radially towards the outside by a metallic belt formed by two layers 5 and 6 made of metallic cords parallel and crossed with respect to one another, by two lateral rubber strips reinforced with nylon cords 7 and 8 parallel to the equatorial plane of the carcass, with superimposed rubber strips at the end of the belt for a portion equal to about 20% of the belt width, by two layers of nylon cords 9, 10 parallel to the equatorial plane of the carcass, whose width is substantially equal to that of the belt.

What is desired to show is the fact that in the tire 1 of FIG. 1 in two planes parallel to the equatorial plane of the carcass immediately up line and down line of the axially innermost edges 11, 12 of the strips 7, 8, there is a discontinuity of thickness in the reinforcing layers and in particular that the layers are thinner in the plane up line of the inner edge of each rubber strip.

As already described, air pockets appeared when tires having such discontinuities were stitched with the metallic rollers of the prior art in the grooves originated by the stitching of belt 5, 6, the thick edges 11, 12 and radially outermost 9, 10.

Another tire to which the invention can be applied is one like that of FIG. 1 but with the layers of nylon cords 9, 10 of the reinforcing structure broken away.

Figure 6:
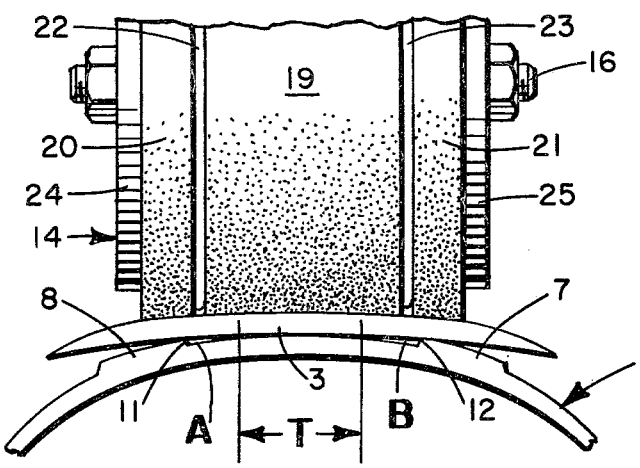

Also in this case, the thickness of the rubber strips overlying the metallic belt at the ends will cause grooves with entrapped air in the conventional stitching of the tread with only metallic discs (see for example the grooves A, B in FIG. 6).

The invention overcomes this drawback and it is now described with reference to the manufacture of a radial tire of the second embodiment.

The device 13 (FIG. 2) for stitching the tread of a pneumatic tire having the carcass already shaped into a toroidal configuration comprises, a first and a second stitching group 14, 15 formed of a composite system of brushes made of synthetic, natural or metallic filaments, and by metallic discs rotatably mounted on a first and a second rotating shaft 16, 17, a conventional driving mechanism which, as explained herebelow, is able to drive the two stitching groups in a predetermined sequence on the tread either separately or contemporaneously in the same working step.

The stitching groups and the relative driving mechanism constitute on the whole the stitching bench 18 of the tread (see in FIG. 5).

The first stitching group 14 is formed by (a) a central circular brush 19 (FIGS. 2, 4, 6 and 7) whose outer development has a width which is smaller than the width of the tread portion overlying the metallic belt between the inner edges of the rubber strips 7,8, (b) by two lateral brushes 20, 21 with an outer development able to stitch at least part of the lateral portions of the tread overlying the rubber strips 7,8, (c) by two metallic discs 22, 23 placed between the central brush 19 and the lateral brushes 20 and 21 and having an outer development adapted to stitch at concentrated pressures the tread portions up line of the rubber strips.

The brushes and the metallic discs are disposed between two coupling flanges 24, 25.

The second stitching group 15 (FIGS. 8 and 9) is formed by a first and a second plurality of metallic discs 26, 27 and by two lateral brushes 28, 29.

Each plurality of metallic discs 26 or 27 (second stitching group 15—see FIGS. 2, 8 and 9) is provided with discs whose outer development, starting from the innermost disc towards the outermost one, is gradually increased so as to stitch the corresponding profile of the tread portions overlying the rubber strips 7, 8 subsequently to the intervention of the first stitching group 14 as explained later on in the operation.

The lateral brushes 28, 29 have an outer cylindrical development having the function of bringing the tread end near to the toroidal carcass.

The brushes, both in the first group 14 and in the second group 15 are made, for example, at first by securing the inner ends of the filaments on the couples of the edges 30 of a metallic tape 30' helically wound, as clearly shown in FIG. 3, and then by arranging the tape 30' on a rotating hub, as shown in FIG. 4, which represents the first stitching group 14.

The same FIG. 4 illustrates the means for varying the number and the composition of the rollers on the shaft and for obtaining or relocating the brushes and discs to form the desired stitching group.

The means comprise two flanges 24, 25 provided with cylindrical bases 32, 33 able to support the tapes of the brushes 20, 21 and comprising at the extremities, abutting surfaces 34, 35 for the blocking of end parts 36, 37 of the discs 22, 23 against corresponding abutting surfaces 38, 39 of the hub 31. The flanges 24, 25 are made with lateral surfaces 40,41 able to hold the end lateral parts 42, 43 of the brushes.

These means comprise further on in each flange and on the hub threaded holes 44, 44' to receive appropriate blocking screws 45.

The driving mechanism for the displacement of the stitching groups may be fluid dynamic systems having pistons for the application of continuous forces over the whole stitching range of each group 14 or 15.

In one embodiment by way of example the stitching groups are mechanically independent from each other and the movement of one group leaves therefore the other group in an unchanged position.

In the preferred embodiment of the stitching bench 18, the first and the second group 14 and 15 are rigidly connected together by means of two levers 46, 47 (FIG. 2) which are in their turn rotate around a connecting pivot 48 through the driving mechanism.

The shape of the levers, the association of the levers to the frame 49 (FIG. 5) of the stitching bench and the driving mechanism are the same as those described in detail in the Italian Pat. No. 936,839 and U.S. Pat. No. 3,819,449.

Herebelow, in order to make the description clearer, with the aid of FIGS. 5A, B and C, the driving mechanism is described. It comprises two double-acting hydraulic cylinders 50, 51 pivoted to the frame 49 whose piston rods 52, 53 are hinged respectively to a connecting pin 54 of the first end 55 of the two L-shaped levers 46, 47 and at the end of a square 56 on which a second connecting pin of the lever coinciding with the second stitching group is hinged.

The square 56 permits moreover a rigid connection of the levers with the frame 49 by means of a strut 57 able to support the weight of the rollers assembly.

The thrust exerted by the piston rods 52, 53 in the direction indicated by the arrows in FIGS. 5A, B and C, determines the desired and predetermined position of the two stitching groups with regard to the building drum 58.

The working of the apparatus is now explained referring to FIGS. 6, 7, 8 and 9 relating to the stitching sequence.

In particular in FIG. 6, the tire 1 is shown after the step of passage of the carcass from the cylindrical configuration to the toroidal one, subsequently to the application of the metallic belt strips and of the rubber strips on the toroidal carcass and to the further expansion of the carcass to reach the final toroidal configuration.

These steps are carried out by means of devices and conditions already known.

For example, the toroidal configuration of the carcass can be made on a drum provided with an expandable membrane or also without membrane, and that is by letting in air under pressure directly inside the cavity determined by the innermost layer of the carcass shaped as a cylindrical sleeve.

At the end of these steps, in any way and by means of any device said steps have been carried out, the tread is applied around the belt and the rubber strips, and the splicing of the tread ends is started.

From now on the stitching steps of the tread are made in the following succession:

The driving mechanism of the bench 18 is started so as to advance the central brush of the first stitching group 14 into contact and under pressure on the tread, as schematically shown in FIG. 5A. During this step, the building drum is rotated and the filaments of the central brush apply uniform pressures on the central portion of the tread until the configuration represented in FIG. 6 is reached and the adhesion of a central length T of the tread with the corresponding underlying belt portion without contact or with very little contact of the remaining tread portions on the rubber strips.

As clearly shown in FIG. 6, the stitching action of the central brush 19 produces the formation of the annular grooves A and B leaving, however, a way for escape for the air between the tread inner layer and the upper surface of the rubber strips.

Figure 7:
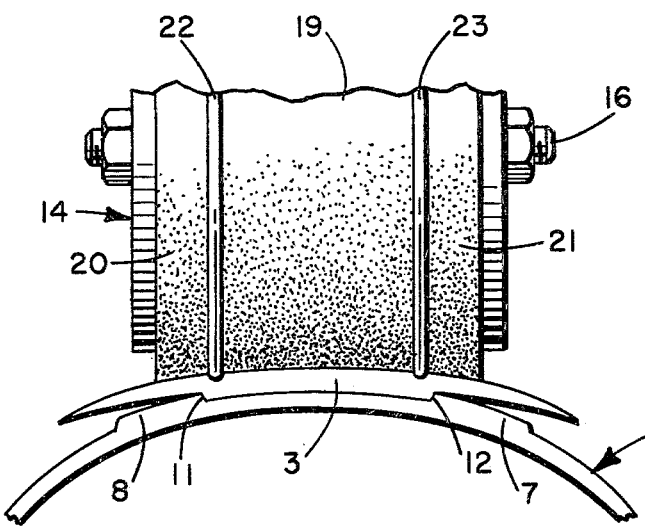
Figure 8:
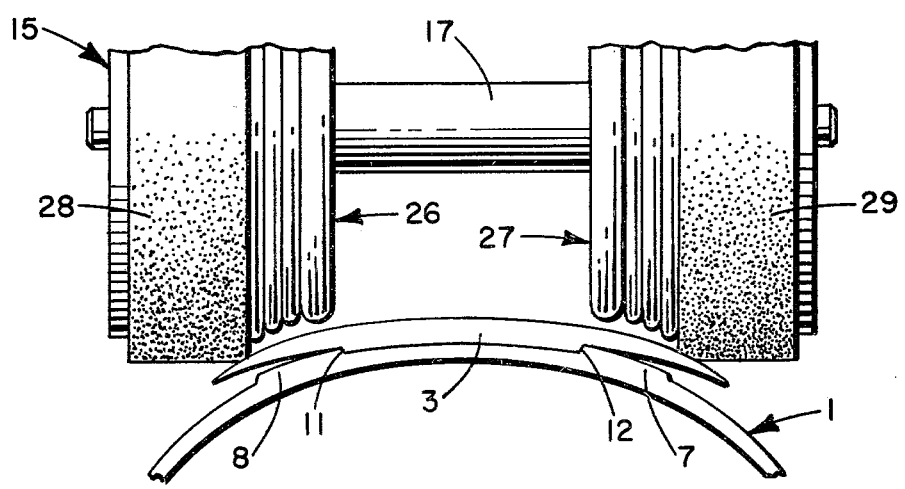
Figure 9:
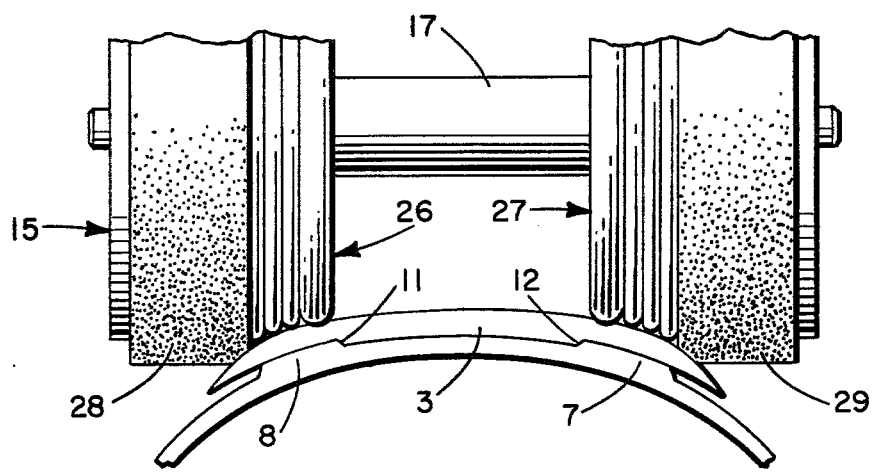

Subsequently, the pressure of the fluid in the first cylinder 50 of the driving mechanism is increased so as to increase the pressure of the whole first stitching group 14 on the tread and the second cylinder 51 is moved so as to bring the second stitching group near the building drum (see FIG. 5B) and to press the brush at low pressures on corresponding lengths of the tread. During this step, while the filaments of the central brush 19 of the first group definitely stitch the tread central portion, with pressures higher than those of the first step, the contiguous metallic discs acting with continuous and concentrated stitching pressure at first reduce and then completely eliminate the annular grooves A and B causing the air still contained therein to flow definitely between the tread T and rubber strips (FIG 7). Always in the same step, the lateral brushes of the first and second stitching group 14, 15 apply uniform pressures on lengths of the tread portions over the rubber strips (FIGS. 7 and 8). The action of the lateral brushes is continuous and gradual since the fluid of the cylinder is increased little by little so as to stitch the tread on the rubber strips with a force sufficient to give rise to a partial adhesion, but still leaving a possibility of escape for the air still contained therein.

Figure 5C:
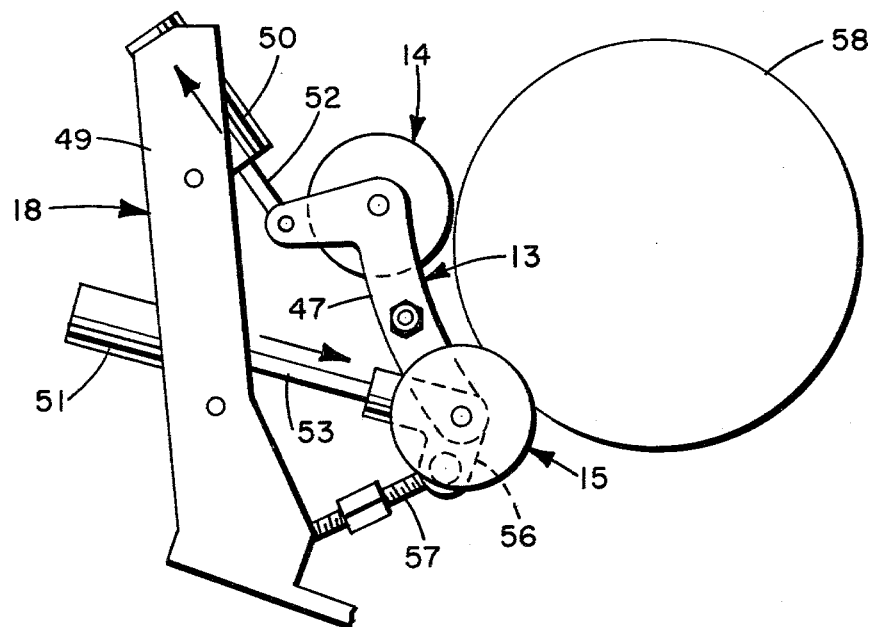

In a further and successive step, the drive mechanism is moved so as to drive the first stitching group 14 away from the tread and to increase still more than in the previous step the stitching pressure of the whole second group (see FIG. 5C). During this step while the metallic discs 26, 27 (FIG. 9) stitch energetically with continuity the tread on the rubber strips causing a complete and positive adhesion, the lateral brushes 28, 29 bring the ends closer to the toroidal carcass.

In the final step, the two stitching groups 14, 15 are pulled away from the building drum and the stitching of the tread extreme or sloping lengths is made, for example, by means of metallic discs associated to the stitching bench or to another equivalent device, not shown.

A further application of the stitching bench according to the invention, in connection with the stitching of a tread on which at the uncured state there are grooves or ribs, is now described.

Generally, as it is known, the tread pattern is obtained in the vulcanizing mold through radial movement of the sectors on whose inner surface the sculptures which it is desired to impress on the uncured tread are carried. In this case, the radial displacement towards the mold inside of the cited sectors, whose grooves penetrate into the uncured tread, causes movement of the tread compound and in the cases in which the tread is constituted by differentiated compounds this movement could be to thicken the material with particular characteristics in a zone different from the predetermined one. In order to limit this phenomenon, sometimes the grooves are already designed in the uncured tread for a certain depth and the stitching bench according to the invention is in fact suitable for stitching this type of tread. This bench comprises two additional stitching groups connected to each other by means of a driving mechanism equal to that shown in FIG. 5 and the two stitching groups differ from those illustrated only in the composition of the various elements, i.e., brushes and metallic discs, assembled together to function with the number and the position of the grooves on the tread.

For example, in stitching a tread having two circumferential symmetrical grooves near the equatorial plane of the tire and/or a reinforcing structure without discontinuities placed under the tread, the preferred embodiment of the bench comprises:

a first stitching group (FIG. 10) 60 having two metallic discs 61, 62 to stitch the base of the tread grooves and two lateral brushes 63, 64 to stitch the remaining central portion of the tread at the grooves sides;

a second stitching group 65 having two lateral brushes 66, 67 to stitch and to bring the tread end near the carcass.

The working of the bench takes place again substantially with the same sequence as the two groups indicated in the three positions shown in FIGS. 5A, B and C and therefore for sake of simplicity the stitching steps are not repeated.

Particularly in the first step (a), through the two metallic discs 61, 62 the stitching of the base of the tread grooves on the underlying reinforcing structure is obtained.

This bench and the relating stitching process constitute an advantage over the results achieved with other known and thinkable solutions.

As a matter of fact, the static and dynamic stitching with only metallic rollers would not be suitable.

A device having only brushes does not guarantee the absence of air pockets between the tread and the reinforcing structure, since the filaments of the brushes would meet with great difficulties in penetrating completely up to the base of the grooves and would lead to an insufficient stitching of the base of the grooves with the underlying layers.

The advantage common to all the methods described in the present description consists in the adoption of brushes, made of filaments oriented radially with respect to its support, able to apply at first low pressures which do not alter or deform the elements to be stitched and are subsequently capable of levelling all of the tread portions, eliminating any possible waviness, due for example to the seasoning time of the various tread strips.

The same brushes being moreover associated to fluid actuated pistons, can be controlled subsequently so as to develop higher pressures which are at least higher than in the previous steps in order to give rise to the real stitching operation.

Generally the composite system brushes made of filaments and metallic discs, is applied to radial tires having complex belts, in particular tires having belts with rubber strips and having a smaller curvature of the carcass which are obstacles to the escape of air.

Moreover, the brushes having filaments which easily correspond to the tread profile make the stitching practically indifferent to the different seasoning of the tread strips and to the variations of room temperature so there is no need for the operator to change the work position of the stitching bench for tires of a given size.

Instead when only metallic discs with an outer rigid development are used changes in position of the stitching rollers are required with variations of the tread profile with the formation of more or less arched lengths because of seasoning of the tire.

Consequently, it was not only practically impossible to predetermine and to code only once the geometric positions of the metallic pressing rollers in "static" or "dynamic" stitching, but a more serious problem was that the correction operation of the bench position was made by the operator and therefore the stitching depended more or less on the sensitivity and the experience of the operator.

Consequently, the invention constitutes an improvement over all the stitching techniques known up to now and the very good results clearly appear at the end of the stitching since the splices of the various elements under the tread can be noted on the tire; this is a clear sign of the effectiveness of the stitching bench action described herein.

Although the invention has been illustrated and described, it is to be understood that variations can be made therein by those skilled in the art without departing from the spirit and scope of the invention except as it is limited by the claims.

What is claimed:

1. A process for manufacturing pneumatic tires comprising a carcass, a tread and a reinforcing structure placed between the carcass and the tread, said reinforcing structure comprising at the ends of its layers of reinforcing material at least two discontinuities in thickness, each discontinuity in thickness being noticeable in two planes parallel to the equatorial plane of the tire, respectively up line and down line of the discontinuity, said thickness being greater in the axially outermost plane, said process being characterized by the fact of comprising, after the toroidal configuration of the carcass and of the reinforcing structure and the application of the tread, the following further steps of:
   (a) stitching by means of brushes provided with filaments the central portion of the tread;
   (b) stitching subsequently to the beginning of step (a) and during step (a), by means of brushes provided with filaments at least a length of the lateral portions of the tread overlying the reinforcing layers with greater thickness and by means of metallic discs the tread portions comprised between the central one and the lateral ones;
   (c) stitching after step (b) by means of metallic discs the lateral portions of the tread overlying the reinforcing layers with greater thickness;
   (d) stitching after step (c) by means of metallic discs the tread end.

2. The process of claim 1, wherein the tread end is pressed with brushes to bring said ends near the toroidal carcass without contact during step (c) and before step (d).

3. The process of claim 1 or 2 for stitching the tread of radial tires comprising a radial carcass and a reinforcing structure placed between the carcass and the tread, said reinforcing structure comprising at least two layers of crossed metallic cords and symmetrically oriented with respect to the longitudinal direction of the tire constituting the belt, at least two reinforcing strips, the first strip being superimposed to the first end of the metallic belt, the second strip being superimposed to the second end of the metallic belt.

4. The process of claim 3 for stitching the tread of radial tires comprising two rubber strips having textile material cords superimposed at the end and inside the edges of the belt, and in a radially outermost position a strip of textile material cords, said textile cords being arranged in a position parallel to the equatorial plane of the tire and being heat shrinkable in length.

5. An apparatus for stitching the tread of pneumatic tires which have a carcass, a tread and a reinforcing structure disposed between the tread and the carcass, said apparatus comprising a first stitching group of brushes and metallic rollers coaxially mounted on the same rotation shaft, means for varying the number and the composition of the rollers on said shaft, said brushes being provided with filaments which are suitable for stitching either the tread portions overlying lengths of the reinforcing structure up line and down line of a discontinuity in thickness of a pneumatic tire which comprise in an axially outermost position reinforcing layers having a greater total thickness, or the tread portions between circumferential grooves.

6. The apparatus of claim 5, comprising a first stitching group for stitching the tread of radial tires which has a radial carcass, a tread, a reinforcing structure placed between the carcass and the tread, said reinforcing structure comprising at least a belt formed by two layers of crossed metallic cords and symmetrically oriented with respect to the longitudinal direction of the tire and at least two rubber strips at the end of the belt provided with nylon cords arranged parallel to the equatorial plane, said first stitching group of rollers comprising a central brush made of filaments to stitch the tread central portion, two lateral brushes to stitch the tread portions overlying the rubber strips, two metallic discs placed between the central and lateral brushes to stitch the tread portions between the central one and the lateral ones up line of the rubber strips.

7. The apparatus of claim 6, comprising a second stitching group provided with a first and a second plurality of metallic discs mounted at the end of a second rotation shaft, each plurality of discs having a diameter gradually increasing from the innermost towards the outermost so as to obtain a profile corresponding to the tread lateral portion overlying the rubber strips to be stitched after the application of said first group.

8. The apparatus of claim 7, comprising two brushes made of filaments and mounted on the second shaft outwardly of said plurality of metallic discs, said brushes being able to bring the tread ends near the toroidal carcass.

9. The apparatus of claim 5, wherein said means for varying the number and composition of the rollers comprise two flanges provided with as many bearing and holding surfaces as brushes; said flanges being slidable on the shaft end of each stitching group to insert or to remove stitching discs and brushes.

10. A stitching bench for attaching the tread of pneumatic tires comprising a first and a second stitching group as in claim 6 or 7 and means for driving the two groups.

11. The stitching bench for the tread of pneumatic tires of claim 10 wherein said means comprise fluid dynamic pistons whose stems act on the ends of the rotation shafts of the stitching groups.

12. A pneumatic tire manufactured according to the process of claim 1 and characterized by the fact that at the end of the stitching process the splices of the various layers under the tread appear on the tire.

13. In a process for making a pneumatic tire having a carcass, a tread and between the carcass and tread, a multi-layered reinforcing structure which varies in thickness, in at least two annular areas which are parallel to the equatorial plane thereof with the thicker area of the reinforcing structure being along its axial outermost lateral edges, the improved method of stitching the tread to a trapezoidal shaped carcass which comprises (a) first stitching the central annular portion of a tread band to a tire carcass and reinforcing structure while rotating on a tire building drum with a rotating circular brush and while continuing (a), (b) stitching said tread overlying the lateral thicker annular areas of the tread band with rotating circular brushes, (c) and then (d) pressing the annular bands between the center and lateral bands with metallic rollers whereby air bubbles between the reinforcing structure and the reinforcing structure are expelled.

14. The process of claim 1 wherein the said discontinuities are symmetrical with respect to the equatorial plane of the tire 15. The process of claim 1 wherein the said discontinuities are asymmetrical with respect to the equatorial plane of the tire.

16. A process for installing a tread on a carcass of a pneumatic tire for a motor vehicle, said process comprising placing a band of unvulcanized rubber composition on a preshaped carcass comprising a structure for reinforcing the resulting tread disposed between the carcass and tread band, said tread band having two laterally spaced annular portions which extend around the lateral edges of the reinforcing structure and an annular central portion combining with said laterally spaced portions to provide a continuous band continuous in width, pressing the said band (a) first across its central portion with a rotating brush, (b) pressing the said laterally spaced portions along their lateral edges with rotating brushes commencing about the same time as (a) is commenced and continuing through step (a), (c) pressing those portions between the portions pressed in (a) and (b) with metallic rollers and (d) then pressing with metallic rollers the lateral edges of the tread band, whereby any air entrapped between said band and the underlying reinforcing structure and carcass is removed by forcing the air laterally outward of the tread band and underlying structure, and vulcanizing the tread band.

17. An apparatus for applying a tread to a tire carcass, said apparatus comprising a first group of brushes and metallic rollers mounted side by side on a single shaft with a central brush and laterally spaced brushes with a metallic roller adjacent to each side of the centrally disposed brush, and a trailing set of brushes and metallic rollers rotatably mounted side by side on a common shaft with metallic rollers in between rotating brushes.

* * * * *